United States Patent
Noda

(10) Patent No.: US 10,449,485 B2
(45) Date of Patent: Oct. 22, 2019

(54) METHOD OF PRODUCING NITROGEN-DEPLETED GAS, METHOD OF PRODUCING NITROGEN-ENRICHED GAS, METHOD OF NITROGEN SEPARATION, AND SYSTEM OF NITROGEN SEPARATION

(71) Applicant: NGK INSULATORS, LTD., Nagoya-Shi (JP)

(72) Inventor: Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 147 days.

(21) Appl. No.: 15/287,796

(22) Filed: Oct. 7, 2016

(65) Prior Publication Data

US 2017/0100696 A1    Apr. 13, 2017

(30) Foreign Application Priority Data

Oct. 9, 2015  (JP) ................................ 2015-201100
Jul. 29, 2016  (JP) ................................ 2016-149458

(51) Int. Cl.
  *B01D 53/22* (2006.01)
  *B01D 71/02* (2006.01)
  *C10L 3/10* (2006.01)

(52) U.S. Cl.
  CPC ........... *B01D 53/228* (2013.01); *B01D 53/22* (2013.01); *B01D 71/028* (2013.01); *C10L 3/105* (2013.01);
  (Continued)

(58) Field of Classification Search
  CPC ..... C10L 3/105; B01D 71/028; B01D 53/228; B01D 53/22; B01D 2257/102; B01D 2256/24
  See application file for complete search history.

(56) References Cited

U.S. PATENT DOCUMENTS 4,842,620 A * 6/1989 Hammel ................ B01D 53/22
                                                    65/31
4,936,887 A * 6/1990 Waldo .................... B01D 53/22
                                                    62/624
(Continued)

FOREIGN PATENT DOCUMENTS

JP     2010-202875 A     9/2010

OTHER PUBLICATIONS

Ting Wu et al., "Influence of propane on $CO_2/CH_4$ and $N_2/CH_4$ Separations in CHA Zeolite Membranes," *Journal of Membrane Science*, 473 (2015), pp. 201-209.

(Continued)

*Primary Examiner* — Anthony R Shumate
(74) *Attorney, Agent, or Firm* — Burr & Brown, PLLC

(57) ABSTRACT

A nitrogen separation system includes a pressurizing apparatus, a temperature regulation apparatus, a nitrogen separation apparatus. The pressurizing apparatus is configured to pressurize a raw material gas to configure a pressurized raw material gas which is in a vapor-liquid equilibrium state with a liquefied gas and contains methane as a principal component and greater than or equal to 1 mol % nitrogen. The nitrogen separation apparatus is configured to separate nitrogen contained in the pressurized raw material gas by use of a nitrogen selective permeation membrane configured from an inorganic material. The pressurization apparatus pressurizes the raw material gas so that a partial pressure of nitrogen in the pressurized raw material gas is greater than or equal to 2 times and less than or equal to 5 times a pressure of the nitrogen-enriched gas.

12 Claims, 7 Drawing Sheets

(52) U.S. Cl.
CPC .... *B01D 2256/24* (2013.01); *B01D 2257/102* (2013.01)

(56) References Cited

U.S. PATENT DOCUMENTS

| | | | | |
|---|---|---|---|---|
| 5,051,114 | A * | 9/1991 | Nemser | B01D 53/228 95/47 |
| 5,139,547 | A * | 8/1992 | Agrawal | F17C 9/04 62/616 |
| 5,141,543 | A * | 8/1992 | Agrawal | F17C 9/04 62/612 |
| 5,352,272 | A * | 10/1994 | Moll | B01D 53/22 96/14 |
| 5,669,958 | A * | 9/1997 | Baker | B01D 53/002 62/624 |
| 6,295,837 | B1 * | 10/2001 | Den | F25J 3/04054 62/434 |
| 6,468,057 | B1 * | 10/2002 | Beck | F04B 17/042 417/411 |
| 2006/0248800 | A1 * | 11/2006 | Miglin | B01B 1/005 48/198.7 |
| 2009/0145847 | A1 * | 6/2009 | Spiegelman | B01D 53/22 210/662 |
| 2009/0286078 | A1 * | 11/2009 | Lee | B01D 53/22 428/364 |
| 2010/0000253 | A1 * | 1/2010 | Fuchs | F25J 1/0025 62/613 |
| 2010/0223950 | A1 | 9/2010 | Malsam | |
| 2012/0036890 | A1 * | 2/2012 | Kimble | F25J 3/0209 62/620 |
| 2013/0233170 | A1 * | 9/2013 | Spiegelman | B01D 71/36 95/23 |
| 2014/0130541 | A1 | 5/2014 | Malsam | |
| 2015/0184930 | A1 * | 7/2015 | Bonnissel | F25J 1/0022 62/611 |
| 2015/0300733 | A1 | 10/2015 | Malsam | |
| 2015/0308737 | A1 * | 10/2015 | Chen | F25J 3/061 62/623 |
| 2016/0090910 | A1 * | 3/2016 | Ploeger | B01D 53/229 60/783 |
| 2016/0332109 | A1 * | 11/2016 | Milli | B01D 53/22 |
| 2017/0038137 | A1 * | 2/2017 | Turney | F25J 1/001 |
| 2017/0296980 | A1 * | 10/2017 | Noda | B01D 69/12 |
| 2018/0112142 | A1 * | 4/2018 | Foody | C10L 3/104 |

OTHER PUBLICATIONS

J. Van Den Bergh et al., "Separation and Permeation Characteristics of a DD3R Zeolite Membrane," *Journal of Membrane Science*, 316 (2008), pp. 35-45.

* cited by examiner

METHOD OF PRODUCING NITROGEN-DEPLETED GAS, METHOD OF PRODUCING NITROGEN-ENRICHED GAS, METHOD OF NITROGEN SEPARATION, AND SYSTEM OF NITROGEN SEPARATION

TECHNICAL FIELD

The present invention relates to a method of producing a nitrogen-depleted gas, a method of producing a nitrogen-enriched gas, a method of nitrogen separation, and a system of nitrogen separation.

BACKGROUND ART

A method is known to typically separate nitrogen from a gas containing nitrogen, methane, ethane, or the like by use of a rubber membrane as a type of organic membrane (reference is made to Patent Literature 1). This method obtains a nitrogen-depleted gas and a nitrogen-enriched gas as a result of selective permeation of methane and ethane in the gas by use of a first rubber membrane and a second rubber membrane.

The Patent Literature 1 is Japanese Patent Application Laid-Open No. 2010-202875.

Furthermore a method has been proposed (reference is made to Non-Patent Literature 1 and 2) to obtain a nitrogen-depleted gas and a nitrogen-enriched gas as a result of selective permeation of nitrogen from a mixed gas of nitrogen and methane by use of an inorganic membrane such as a CHA zeolite membrane or DDR zeolite membrane.

The Non-Patent Literature 1 is "Influence of propane on $CO_2/CH_4$ and $N_2/CH_4$ separations in CHA zeolite membranes, Journal of Membrane Science 473, (2015) 201-209" (Ting Wu (six others)). The Non-Patent Literature 2 is "Separation and permeation characteristics of a DD3R zeolite membrane, Journal of Membrane Science 316 (2008), 35-45" (J. van den Bergh (four others)).

SUMMARY OF THE INVENTION

Technical Problem

However, since the method in Patent Literature 1 uses an organic membrane, there is the problem that performance of the organic membrane is adversely affected by supply of a low-temperature gas.

On the other hand, since the methods in Non-Patent Literature 1 or 2 use an inorganic membrane, although adverse effects on the performance of the organic membrane by supply of a low-temperature gas can be inhibited, there remains scope for the enhancement of separation performance due to the lack of detailed examination of separation conditions.

The present invention is proposed in light of the situation described above, and has the purpose of providing a method of producing a nitrogen-depleted gas that enables the efficient depletion of nitrogen, a method of producing a nitrogen-enriched gas that enables the efficient enrichment of nitrogen, a method of nitrogen separation that enables the efficient depletion/enrichment of nitrogen, and a system of nitrogen separation that enables the efficient depletion/enrichment of nitrogen.

Solution to Problem

A nitrogen separation system includes a pressurizing apparatus, a temperature regulation apparatus, a nitrogen separation apparatus. The pressurizing apparatus is configured to pressurize a raw material gas to configure a pressurized raw material gas. The raw material gas is in a vapor-liquid equilibrium state with a liquefied gas. The raw material gas contains methane as a principal component and greater than or equal to 1 mol % nitrogen. The temperature regulation apparatus is configured to regulate a temperature so that a temperature of the pressurized raw material gas is regulated to be higher than a temperature of the raw material gas. The nitrogen separation apparatus is configured to separate nitrogen contained in the pressurized raw material gas by use of a nitrogen selective permeation membrane configured from an inorganic material to produce a nitrogen-depleted gas and a nitrogen-enriched gas from the pressurized raw material gas. The pressurization apparatus pressurizes the raw material gas so that a partial pressure of nitrogen in the pressurized raw material gas is greater than or equal to 2 times and less than or equal to 5 times a pressure of the nitrogen-enriched gas.

Effect of Invention

The present invention enables the provision of a method of producing a nitrogen-depleted gas by enabling the efficient depletion of nitrogen, a method of producing a nitrogen-enriched gas by enabling the efficient enrichment of nitrogen, a method of nitrogen separation by enabling the efficient depletion/enrichment of nitrogen, and a system of nitrogen separation by enabling the efficient depletion/enrichment of nitrogen.

DESCRIPTION OF EMBODIMENTS

Figure 1:
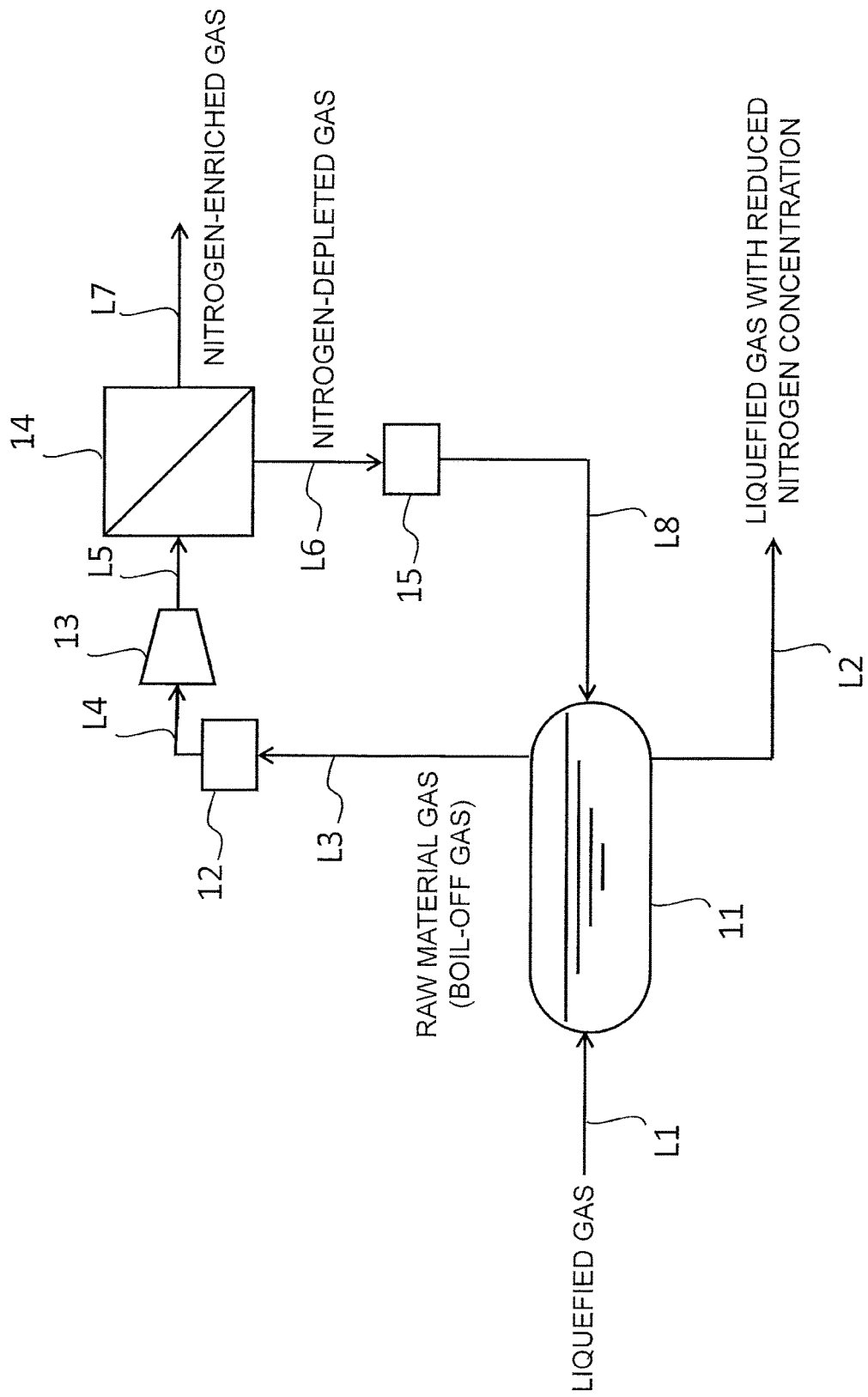
FIG. 1 is a functional block diagram illustrating a configuration of a nitrogen separation system.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions.

Configuration of Nitrogen Separation System 10

A configuration of the nitrogen separation system 10 according to the present embodiment will be described making reference to the figures. FIG. 1 is a functional block diagram illustrating a configuration of a nitrogen separation system 10.

The nitrogen separation system 10 includes a storage tank 11 (an example of "a liquefied gas retention unit"), a heat exchanger 12 (an example of "a temperature regulation apparatus"), a compressor 13 (an example of "a pressurization apparatus"), a nitrogen separation apparatus 14 (an example of a "nitrogen separation apparatus"), a heat exchanger 15, and a first line L1 to eighth line L8.

The storage tank 11 is supplied with a fluid (referred to below as "liquefied gas") such an LNG (liquefied natural gas) which includes methane as a principal component and nitrogen as an accessory component through a first line L1. The storage tank 11 stores the liquefied gas. The liquefied gas stored in the storage tank 11 is discharged from a second line L2 and used as a product. The inner portion of the storage tank 11 is subject to the production of a gas (referred to below as "raw material gas") in a vapor-liquid equilibrium state by vaporization from the liquefied gas.

The raw material gas contains methane as a principal component, and contains nitrogen as an accessory component. Since the boiling point of nitrogen is lower than the boiling point of methane, the nitrogen concentration of the raw material gas is higher than the nitrogen concentration in the liquefied gas. Consequently, a gas exhibiting a high nitrogen concentration is introduced into the nitrogen separation apparatus by using the raw material gas rather than by use of the gas prior to configuration as a liquefied gas. The methane concentration in the raw material gas can be configured as greater than or equal to 50 mol %, and preferably as greater than or equal to 80 mol %. The nitrogen concentration in the raw material gas is greater than or equal to 1 mol % and less than 50 mol %. The raw material gas is sent to the heat exchanger 12 through a third line L3 connected to the storage tank 11.

The heat exchanger 12 enables heating of the raw material gas. A known configuration may be used as the heat exchanger 12. For example, a plate-fin type heat exchanger or a multi-tubular heat exchanger or the like may be used as the heat exchanger 12. However there is no limitation in this regard. The temperature-regulated raw material gas is sent to the compressor 13 through a fourth line L4.

The raw material gas is pressurized by the heat exchanger 12, the compressor 13, or the like to be configured as a pressurized raw material gas (pressurization step). The heat exchanger 12 regulates pressure by regulating the temperature of the raw material gas, and the compressor 13 regulates the pressure by pressurizing the raw material gas to a predetermined pressure. The pressurization step is configured to pressurize the raw material gas so that the partial pressure of the nitrogen contained in the pressurized raw material gas is greater than or equal to 2 times and less than or equal to 5 times the pressure of the nitrogen-enriched gas described hereafter. Pressurization of the raw material gas so that the partial pressure of the nitrogen contained in the pressurized raw material gas is greater than or equal to 2 times the pressure of the nitrogen-enriched gas enables enhancement of the amount of nitrogen passing through the separation membrane of the nitrogen separation apparatus 14. The pressurization of the raw material gas so that the partial pressure of the nitrogen contained in the pressurized raw material gas is less than or equal to 5 times the pressure of the nitrogen-enriched gas enables a reduction in the amount of methane passing through the separation membrane of the nitrogen separation apparatus 14, and a reduction in the energy required for pressurization. When only one of the heat exchanger 12 and the compressor 13 is configured to enable pressurization of the raw material gas to a predetermined pressure, the other may be omitted.

The temperature of the pressurized raw material gas is regulated by the heat exchanger 12, the compressor 13, or the like (temperature regulation step). The temperature of the pressurized raw material gas is regulated to be higher than the temperature of the raw material gas (approximately −160 degrees C.). The temperature of the pressurized raw material gas is preferably greater than or equal to −140 degrees C., and more preferably greater than or equal to −120 degrees C. In this manner, the separation step described hereafter is enabled for efficient depletion/enrichment of nitrogen. Furthermore, the temperature of the pressurized raw material gas is preferably regulated to less than or equal to −40 degrees C., more preferably regulated to less than or equal to −70 degrees C., and still more preferably regulated to less than or equal to −100 degrees C. In this manner, energy can be reduced when liquefying the nitrogen-deficient gas as described below. In particular, liquefaction costs can be reduced since a precooling step for liquefaction of the nitrogen-depleted gas can be omitted by regulating to less than or equal to −40 degrees C. When using a nitrogen-deficient gas in the absence of liquefaction, the temperature of the pressurized raw material gas may be suitably set in response to the use environment. When only one of the heat exchanger 12 and the compressor 13 is configured to enable temperature regulation of the pressurized raw material gas, the other may be omitted.

A known compressor capable of pressurizing the raw material gas to 500 kPa to 50,000 kPa may be used as the compressor 13. For example, a reciprocating compressor, swashplate compressor, diaphragm compressor, or the like may be used as the compressor 13. However, there is no limitation in this regard. The pressurized raw material gas is sent through the fifth line L5 to the nitrogen separation apparatus 14.

The nitrogen separation apparatus 14 produces a nitrogen-depleted gas and nitrogen-enriched gas from the pressurized raw material gas by separating the nitrogen contained in the pressurizing raw material gas (separation step). The nitrogen-depleted gas is a gas having a lower nitrogen concentration when compared to the raw material gas. The nitrogen-enriched gas is a gas having a higher nitrogen concentration when compared to the raw material gas. The configuration of the nitrogen separation apparatus 14 will be described below.

The produced nitrogen-depleted gas is sent through the sixth line L6 to the heat exchanger 15. The nitrogen concentration of the nitrogen-depleted gas is preferably less than 4 mol %, and more preferably less than 1 mol %.

The produced nitrogen-enriched gas is extracted through the seventh line L7. The nitrogen-enriched gas can be used as fuel or as a cooling medium, and may also be disposed of into an external unit. The nitrogen concentration of the nitrogen-enriched gas is preferably greater than or equal to 20 mol %, and more preferably greater than or equal to 30 mol %. Methane loss from the raw material gas can be reduced by configuring the nitrogen concentration to greater than or equal to 20 mol %.

The heat exchanger 15 can cool and liquefy the nitrogen-depleted gas. A known configuration can be used as the heat exchanger 15. For example, a plate-fin type heat exchanger, a multi-tubular heat exchanger, a spiral heat exchanger, or the like can be used as the heat exchanger 15. However, there is no limitation in this regard. The liquefied nitrogen-depleted gas is sent to the storage tank 11 through the eighth line L8.

Configuration of Nitrogen Separation Apparatus 14

Figure 2:
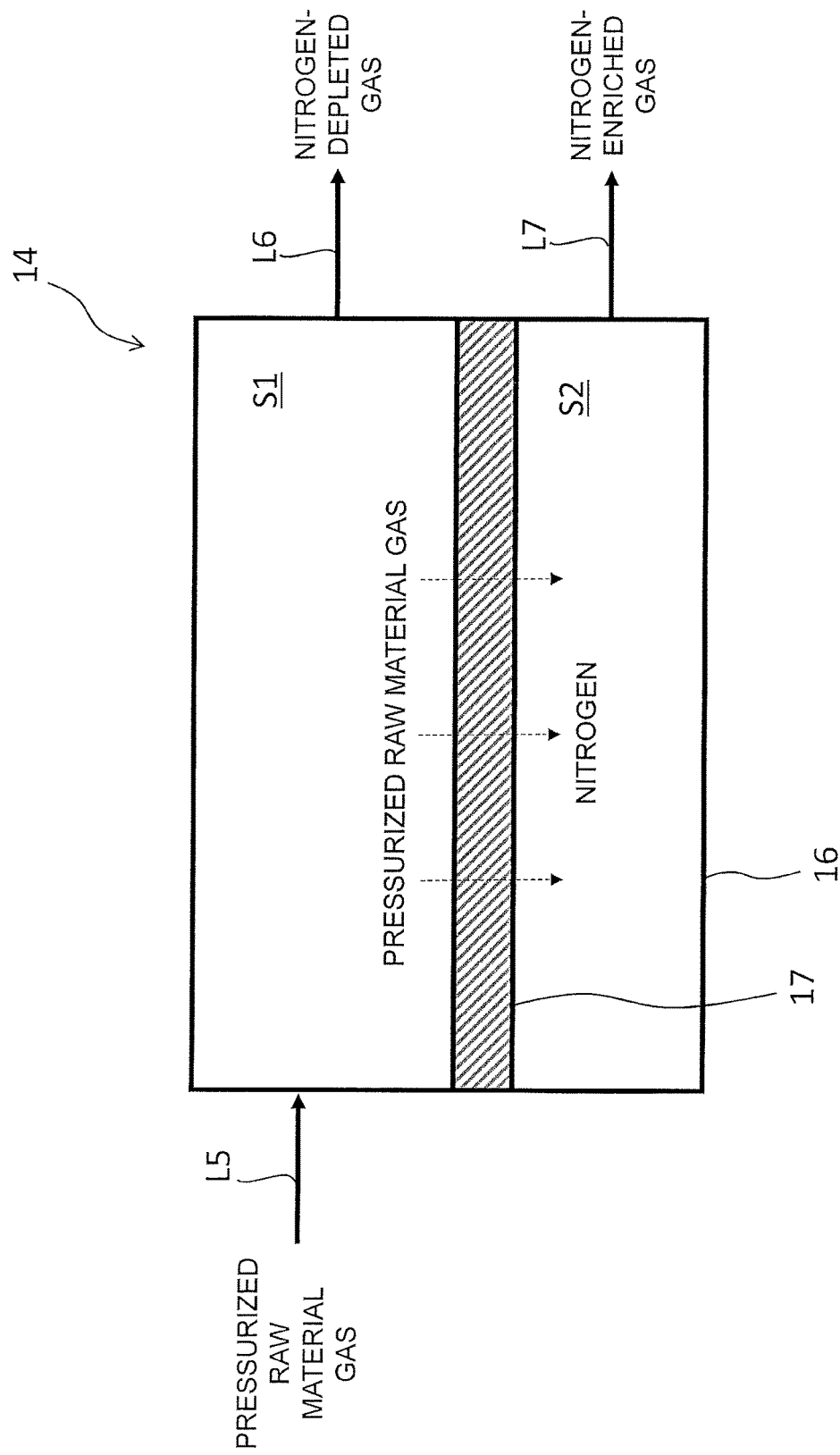
FIG. 2 illustrates a sectional view of a configuration of a nitrogen separation apparatus.

The configuration of the nitrogen separation apparatus 14 according to the present embodiment will be described making reference to the figures. FIG. 2 illustrates a sectional view of a configuration of a nitrogen separation apparatus 14.

The nitrogen separation apparatus 14 comprises a containment body 16 and a separation membrane structure 17.

The containment body 16 contains the separation membrane structure 17. The inner cavity of the containment body 16 is partitioned by the separation membrane structure 17 into a supply-side space S1 and a permeation-side space S2.

Raw material gas that is pressurized by the compressor 13 (pressurized raw material gas) is supplied through the fifth line L5 into the supply-side space S1. Nitrogen that has passed through the separation membrane structure 17 is recovered in the permeation-side space S2. Selective permeation by the separation membrane structure 17 on the nitrogen contained in the pressurized raw material gas produces a nitrogen-depleted gas in the supply-side space S1 and produces a nitrogen-enriched gas in the permeation-side space S2. The nitrogen-depleted gas is discharged from the supply-side space S1 to the sixth line L6 and the nitrogen-enriched gas is discharged from the permeation-side space S2 to the seventh line L7.

The separation membrane structure 17 can disposed in an inner portion of the containment body 16, and is not particularly limited in relation to shape or size as long as selective permeation of nitrogen is enabled.

In contrast to an organic membrane, an inorganic membrane exhibits resistance to deterioration in separation performance even when exposed to the high-pressure methane or low-temperature gases as described above. Therefore, an inorganic membrane is used as the separation membrane structure.

Configuration of Separation Membrane Structure 17

Figure 3:
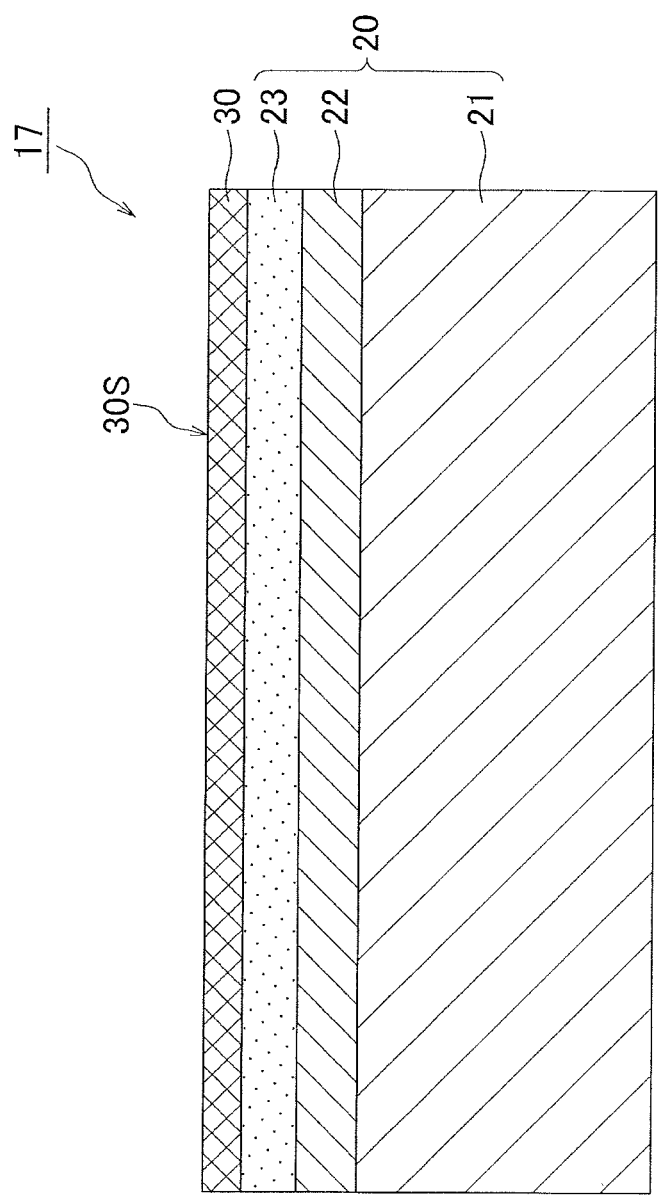
FIG. 3 illustrates a sectional view of a configuration example of a separation membrane structure.

FIG. 3 illustrates a sectional view of a configuration example of the separation membrane structure 17. The separation membrane structure 17 includes a porous support body 20 and a separation membrane 30 (an example of a "nitrogen selective permeation membrane").

The porous support body 20 supports the separation membrane 30. The porous support body 20 exhibits chemical stability to enable formation (crystallization, coating or deposition) of the separation membrane in a film configuration on a surface. The shape of the porous support body 20 includes a honeycomb shape, a monolithic shape, planar shape, tubular shape, cylindrical shape, columnar shape, a square column shape, or the like.

The porous support body 20 according to the present embodiment includes a substrate 21, an intermediate layer 22 and a surface layer 23.

The substrate 21 is configured by a porous material. The porous material includes use of a ceramic sintered body, metal, organic polymer, glass, carbon, or the like. The ceramic sintered body includes alumina, silica, mullite, zirconia, titania, yttria, silicon nitride, silicon carbide, or the like. The metal includes aluminum, iron, bronze, stainless steel, or the like. The organic polymer includes polyethylene, polypropylene, polytetrafluoroethylene, polysulfone, polyimide, or the like.

The substrate 21 may include an inorganic binder. The inorganic binder may include at least one of titania, mullite, sinterable alumina, silica, glass frits, clay minerals, and sinterable cordierite.

For example, the average pore diameter of the substrate 21 may be 5 micrometers to 25 micrometers. The average pore diameter of the substrate 21 can be measured by a mercury porosimeter. The porosity of the substrate 21 may be configured to 25% to 50%. The average particle diameter of the porous material that configures the substrate 21 may be for example 5 micrometers to 100 micrometers. In the present embodiment, the term "average particle diameter" denotes the value of the arithmetic mean for the maximum diameter of 30 particles that are measured by cross sectional micro-structure observation by use of a scanning electron microscope (SEM).

The intermediate layer 22 is formed on the substrate 21. The intermediate layer 22 can be configured by the porous material as that used the substrate 21. The average pore diameter of the intermediate layer 22 may be smaller than the average pore diameter of the substrate 21, and for example, may be configured as 0.005 micrometers to 2 micrometers. The average pore diameter of the intermediate layer 22 may be measured by a perm-porometer. The porosity of the intermediate layer 22 may be configured for example to 20% to 60%. For example, the thickness of the intermediate layer 22 may be configured as 30 micrometers to 300 micrometers.

The surface layer 23 is formed on the intermediate layer 22. The surface layer 23 can be configured by the porous material as that used in the substrate 21. The average pore diameter of the surface layer 23 may be smaller than the average pore diameter of the intermediate layer 22, and for example, may be configured as 0.001 micrometers to 1 micrometer. The average pore diameter of the surface layer 23 may be measured by a perm-porometer. The porosity of the surface layer 23 may be configured for example to 20% to 60%. The thickness of the surface layer 23 for example may be configured as 1 micrometer to 50 micrometers.

The separation membrane 30 is formed on the porous support body 20 (more specifically, on the surface layer 23). The separation membrane 30 can be configured from an inorganic material, a composite material of an inorganic material and an organic material, or a composite material of an inorganic material and metallic material. In consideration of heat resistant properties or organic-solvent resistant properties, it is preferred to configure the separation membrane 30 from an inorganic material such as zeolite, zeolite like structure compound, silica, carbon, or the like, with zeolite and zeolite like structure compounds being preferred due to the ease of restricting a pore diameter distribution to a narrow range. Zeolite and zeolite like structure compounds include silicalites, aluminosilicates, titanosilicates, aluminophosphates, silica aluminophosphates, or the like.

The average pore diameter of the separation membrane 30 is greater than or equal to 0.30 nm and less than or equal to 0.48 nm. Consequently, the separation membrane 30 allows permeation of nitrogen (kinematic diameter: approximately 0.36 nm) and restricts permeation of methane (kinematic diameter: approximately 0.38 nm). Therefore, the separation membrane 30 functions as a "nitrogen selective permeation membrane" that allows selective permeation of nitrogen in a raw material gas that contains methane and nitrogen. In consideration of both separation performance and permeation rate, the average pore diameter of the separation membrane 30 is configured as preferably greater than or equal to 0.32 nm and less than or equal to 0.44 nm, and more preferably greater than or equal to 0.33 nm and less than or equal to 0.41 nm.

There is no particular limitation on the thickness of the separation membrane 30, and it may be configured for example to 1 micrometer to 10 micrometers. When the separation membrane 30 has a thick configuration, there is a tendency for the nitrogen separation performance to be enhanced, and when the separation membrane 30 has a thin configuration, there is a tendency for the nitrogen permeation rate to increase.

When the separation membrane 30 is a zeolite membrane, there is no particular limitation on the framework structure (type) of the zeolite, and for example may include ABW, ACO, AEI, AEN, AFN, AFT, AFV, AFX, AHT, APC, ATN ATT, ATV, AVL, AWO, AWW, BIK, CAS, CDO, CGS, CHA, DAC, DDR, DFT, EAB, EEI, EPI, ERI, ESV, GIS, HEU, IFY, IHW, IRE, ITE, ITW, JBW, JOZ, JSN, KFI, LEV, LTA, LTJ, MER, MON, MTF, MVY, NPT, NSI, OWE, PAR, PAU, PHI, RHO, RTE, RTH, RWR, SAS, SAT, SBN, SFW, SIV, TSC, UEI, UFI, VNI, WEI, WEN, YUG, ZON, or the like. In particular, zeolites that exhibit ease of crystallization such as AEI, AFX, CHA, DDR, ERI, GIS, HEU, LEV, LTA, and RHO are preferred.

When the framework forming the pores of the zeolite or zeolite like structure compound has a ring that is a less than or equal to an oxygen n-membered ring, the arithmetic mean of the short diameter and the long diameter of the oxygen n-membered ring pore is taken to be the average pore diameter of the zeolite. The term oxygen n-membered ring simply means an n-membered ring, and the number of oxygen atoms that configure the framework forming the pore is "n", and includes at least one type of Si atom, Al atom, and P atom. Each of the oxygen atoms are bound to Si atom, Al atom, or P atom, or the like that configures the ring structure. For example, when a zeolite has pores configured from an oxygen 8-membered ring, an oxygen 6-membered ring, an oxygen 5-membered ring, and an oxygen 4-membered ring (that is to say, only has pores formed from rings of less than or equal to an oxygen 8-membered ring), the arithmetic mean of the short diameter and the long diameter of the oxygen 8-membered ring pore is taken to be the average pore diameter.

Furthermore, when the zeolite or zeolite like structure compound has plural oxygen n-membered ring pores having equal values for "n", the arithmetic mean of the short diameter and the long diameter of all the oxygen n-membered ring pores is taken to be the average pore diameter of the zeolite. For example, when a zeolite has pores configured from less than or equal to an oxygen 8-membered ring, and when there is plural types of oxygen 8-membered ring pores, the arithmetic mean of the short diameter and the long diameter of all the oxygen 8-membered ring pores is taken to be the average pore diameter.

In this manner, the average pore diameter of the zeolite or zeolite like structure compound is determined uniquely by the framework structure. The average pore diameter of each framework structure of a zeolite may be obtained by use of the values disclosed in The International Zeolite Association (IZA), "Database of Zeolite Structures" [online], [searched Aug. 24, 2015], Internet URL: http://www.iza-structure.org/databases/. To enable efficient separation performance of nitrogen and methane, the zeolite or zeolite like structure compound preferably has pores configured from rings of oxygen 8-membered rings, and more preferably from only pores formed from rings of less than or equal to oxygen 8-membered rings.

When the separation membrane 30 is a silica membrane, the coefficient of variation and the average pore diameter can be adjusted by controlling the type of starting materials for the membrane, the hydrolysis conditions for the starting materials for the membrane, the firing temperature, the firing time, or the like. The average pore diameter of the silica membrane can be calculated based on Formula (1) below. In Formula (1), $d_p$ denotes average pore diameter of a silica membrane, f denotes a normalized Knudsen-type permeation rate (permeance), $d_{k,i}$ denotes the diameter of the molecule used in the dispersion testing, and $d_{k,He}$ denotes the diameter of a helium molecule.

$$f=(1-d_{k,i}/d_p)^3/(1-d_{k,He}/d_p)^3 \qquad (1)$$

Detailed description of the method of calculating the average pore diameter and the Knudsen dispersion testing is disclosed in Hye Ryeon Lee (four others), Evaluation and fabrication of pore-size-tuned silica membranes with tetraethoxydimethyl disiloxane for gas separation, AIChE Journal, volume 57, Issue 10, 2755-2765, October 2011.

When the separation membrane 30 is a carbon membrane, the coefficient of variation and the average pore diameter can be adjusted by controlling the type of starting materials for the membrane, the firing temperature, the firing time, the firing atmosphere, or the like. The average pore diameter of the carbon membrane can be calculated based on Formula (1) above.

The separation membrane 30 may include addition of at least one of a metal cation that facilitates adsorption of nitrogen compared to methane (referred to below as "nitrogen adsorbing metal cation") and a metal complex (referred to below as "nitrogen adsorbing metal complex"). In this manner, the separation membrane 30 selectively adsorbs nitrogen in the raw material gas. The nitrogen adsorbing metal cation may use at least one type selected from Sr, Mg, Li, Ba, Ca, Cu, and Fe. The nitrogen adsorbing metal complex may use a complex including at least one type selected from Ti, Fe, Ru, Mo, Co, and Sm. The type and addition amount (concentration) of the nitrogen adsorbing metal cation and the nitrogen adsorbing metal complex in the separation membrane 30 can be measured by EDX (energy dispersive X-ray spectroscopy). Although there is no particular limitation in the overall concentration of the nitrogen adsorbing metal cation and the nitrogen adsorbing metal complex, and for example, can be configured to 0.01% to 60%. When nitrogen absorption characteristics are considered, it is preferably greater than or equal to 0.03%, and is more preferably less than or equal to 50% in light of inhibiting pore blockage as a result of an excessive amount of the nitrogen adsorbing metal cation and the nitrogen adsorbing metal complex.

In the present embodiment, the feature of "facilitates adsorption of nitrogen compared to methane" means a configuration in which the absorption amount of nitrogen is greater than the adsorption amount of methane. The adsorption amount can be compared by measuring the adsorption amount of nitrogen and methane by use of a powder of a substance that configures the separation membrane 30. Although there is no particular limitation on the method of measuring the adsorption amount, measurement may be performed under predetermined conditions (−80 degrees C. and 0.1 MPa) of the adsorption amount respectively corresponding to methane and nitrogen for example by use of a gas adsorption measurement instrument.

The permeation rate (permeance) of nitrogen in the separation membrane 30 is greater than the permeation rate of methane. The permeation rate is the amount of gas permeating through the separation membrane 30 per unit time·unit membrane surface area·unit pressure difference, and is expressed in units of [mol/(m²·s·Pa)]. (Nitrogen permeation rate/methane permeation rate) in the separation membrane 30 is preferably greater than or equal to 20, more preferably greater than or equal to 30, and still more preferably greater than or equal to 40. Methane loss can be reduced by configuring (nitrogen permeation rate/methane permeation rate) to greater than or equal to 20.

The aperture shape of a pore 30a on the surface 30S may be perfectly circular, or non-perfectly circular. When the aperture shape is non-perfectly circular, the pore 30a has a long diameter $D_L$ and a short diameter $D_S$. The long diameter $D_L$ is the maximum diameter (maximum value of the interatomic distance of oxygen) of the pore 30a. The short diameter $D_S$ is the diameter of the pore 30a in a direction approximately orthogonal to the long diameter $D_L$. The long diameter $D_L$ is larger than the short diameter $D_S$. Therefore the ratio of the long diameter $D_L$ to the short diameter $D_S$ (long diameter $D_L$/short diameter $D_S$) is greater than 1.0. The ratio of the long diameter $D_L$ to the short diameter $D_S$ is preferably less than or equal to 2.0, and more preferably less than or equal to 1.8. Deformation of the pore under pressure can be suppressed and entry of methane into the pore can be suppressed by a configuration in which the ratio of the long diameter $D_L$ to the short diameter $D_S$ is less than or equal to 2.0. The term "perfectly circular" includes a shape such as an overall uniform star-shaped polygon, and "non-perfectly circular" includes an overall flat star-shaped polygon.

When the separation membrane 30 is a zeolite membrane, the molar ratio of Si atoms, Al atoms, and P atoms in the zeolite membrane preferably satisfies at least one of Si/Al≥3.0 and P/Al≥1.5. Efficient separation of nitrogen and methane even at low temperatures is enabled by a configuration in which at least one of Si/Al≥3.0 and P/Al≥1.5 is satisfied. An element other than Si, Al, P or O may be included in the zeolite membrane.

OPERATION AND EFFECT

Although the detailed examination of separation conditions have not been investigated in relation to conventional methods of obtaining a nitrogen-depleted gas and nitrogen-enriched gas by selective permeation of nitrogen from a low temperature gas using an inorganic membrane, there remains scope for the enhancement of separation performance.

As a result of the diligent investigations performed by the present inventors or the like, the insight has been gained that separation performance of nitrogen by an inorganic membrane can be enhanced by controlling the nitrogen partial pressure in the pressurized raw material gas to a predetermined range relative to the pressure of the nitrogen enriched gas.

The nitrogen separation system 10 according to the present embodiment specifically includes a storage tank 11 (an example of "a liquefied gas retention unit"), a compressor 13 (an example of "a pressurization apparatus"), and a nitrogen separation apparatus 14 (an example of a "nitrogen separation apparatus"). The compressor 13 pressurizes a raw material gas to configure a pressurized raw material gas. The raw material gas is in a vapor-liquid equilibrium state with a liquefied gas, and contains methane as a principal component, and contains at least 1 mol % of nitrogen. The compressor 13 pressurizes the raw material gas so that the partial pressure of the nitrogen contained in the pressurized raw material gas is greater than or equal to 2 times and less than or equal to 5 times the pressure of the nitrogen-enriched gas. The nitrogen separation apparatus 14 produces nitrogen-depleted gas and a nitrogen-enriched gas from the pressurized raw material gas by separation of the nitrogen contained in the pressurized raw material gas using the separation membrane 30 (example of "a nitrogen selective permeation membrane") that is configured from an inorganic material.

As described above, the nitrogen separation system 10 recovers nitrogen from the raw material gas with a nitrogen selective permeation membrane that is an inorganic membrane. Since the raw material gas is pressurized so that the partial pressure of the nitrogen contained in the pressurized raw material gas is greater than or equal to 2 times and less than or equal to 5 times the pressure of the nitrogen-enriched gas, the amount of nitrogen that passes through the nitrogen selective permeation membrane is enhanced and it is possible to reduce the methane amount that passes the nitrogen selective permeation membrane. Consequently, the depletion/enrichment of nitrogen can be efficiently performed.

OTHER EMBODIMENTS

Although an embodiment of the present invention has been described, the present invention is not limited to the above embodiment, and various modifications are possible within a scope that does not depart from the spirit of the invention.

Figure 4:
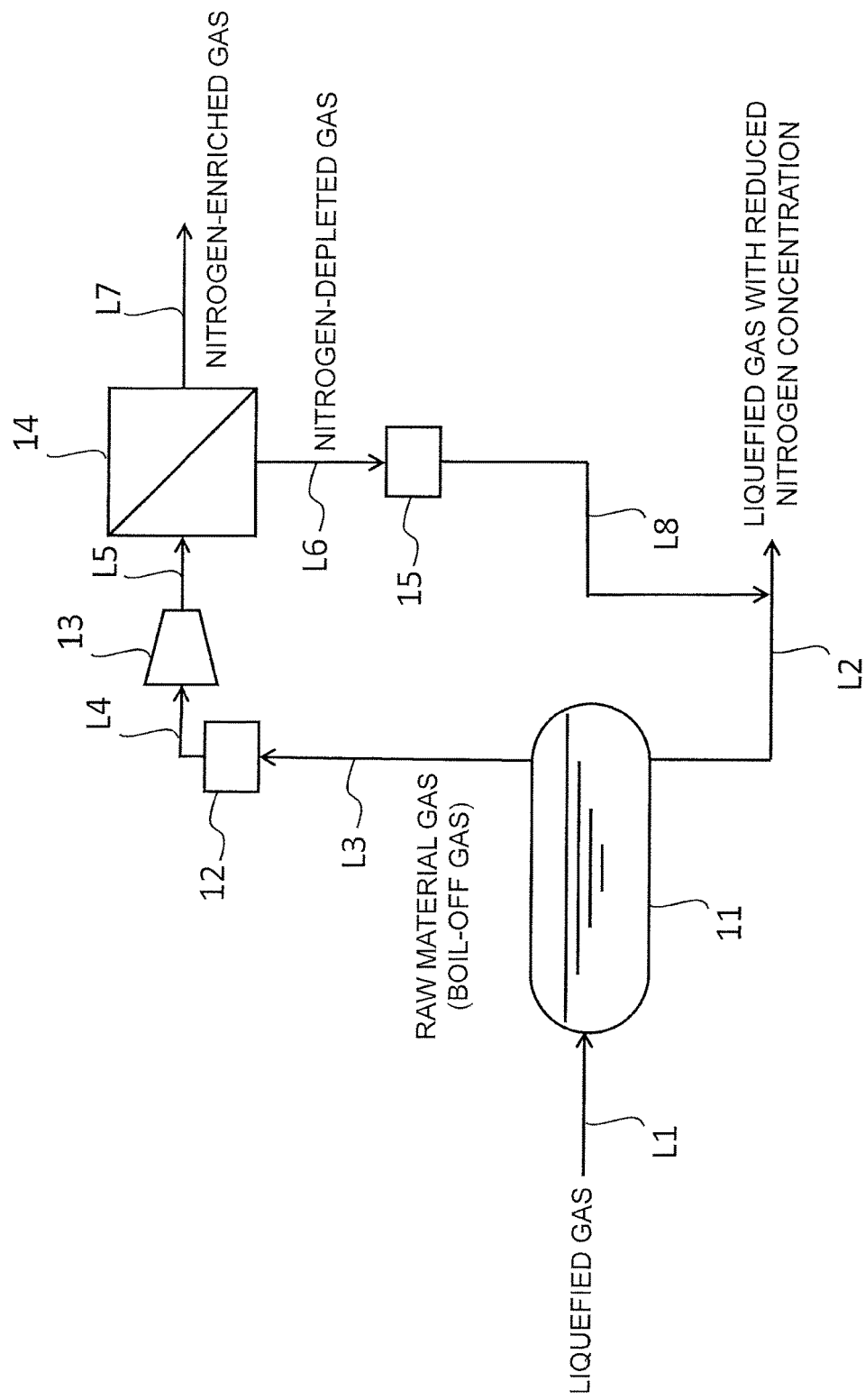
FIG. 4 is a functional block diagram illustrating another configuration of a nitrogen separation system.

In the above embodiment, the liquefied nitrogen-depleted gas is sent to the storage tank 11 through the eighth line L8. However, direct discharge into the second line L2 is possible as illustrated in FIG. 4.

In the above embodiment, the liquefied nitrogen-depleted gas is directly sent to the storage tank 11 through the eighth line L8. However, it may be returned to the first line L1, or may be returned to the previous step of the first line L1.

In the above embodiment, the storage tank 11 is used as a liquefied gas retention unit. However, a liquefied gas retention unit may be configured by a flash tank, a distillation column, or the like as long as a raw material gas is obtained that contains methane as a principal component and contains greater than or equal to 1 mol % nitrogen.

In the above embodiment, although the heat exchanger 12 is disposed between the storage tank 11 and the compressor 13, the heat exchanger may be disposed between the compressor 13 and the nitrogen separation apparatus 14.

EXAMPLES

The examples of the present invention will be described below. However, the present invention is not thereby limited to the following examples.

Preparation of Nitrogen Separation Apparatus A

A nitrogen separation apparatus A is prepared as described below.

20 parts by mass of an inorganic binder are added to 100 parts by mass of alumina particles having an average particle diameter of 50 micrometers, and then water, a dispersing agent and a thickener are added, and kneaded to prepare clay.

Next, a green body for the monolithic substrate that forms plural through-holes is prepared by extrusion molding of the clay. Then, the green body for the substrate is fired (1250 degrees C., 1 hour).

PVA (organic binder) is added to titania and alumina having an average particle diameter of 50 micrometers to thereby prepare a slurry for an intermediate layer. A green body for the intermediate layer is formed on an inside surface of each through-hole by a filtration method. Then, the green body for the intermediate layer is fired (1250 degrees C., 1 hour) to form the intermediate layer.

Then, a surface layer slurry is prepared using alumina having an average particle diameter of 0.3 micrometers to 0.6 micrometers, and a green body for the surface layer is formed on an inside surface of each intermediate layer by a filtration method. Then, the green body for the surface layer is fired (1250 degrees C., 1 hour) to form the surface layer, and is configured as a support body.

Next, a DDR zeolite seed crystal (referred to below as "seed crystal") is prepared using a DDR zeolite powder prepared based on the method disclosed in PCT Laid Open Application 2010/090049A1.

A dispersion in which the seed crystal is dispersed in water is dripped into ethanol and stirred to thereby prepare a seeding slurry.

The seeding slurry is poured into a wide-mouth funnel disposed above the vertically-disposed support body, and the seeding slurry flows from the outlet of the wide-mouth funnel and flows into each through-hole of the support body. Then, air at room temperature is blown into each through-hole to thereby dry the seeding slurry.

An ethylene diamine solution in which 1-adamantaneamine is dissolved into a silica dispersion solution, stirred and diluted by addition of ion exchanged water to prepare a membrane-forming starting material solution.

Next, the support body including the seed crystals is disposed in a stainless steel pressure-resistant container including an inner tube of fluorocarbon resin and the blended membrane-forming starting material solution is placed therein and heated (hydrothermal synthesis). In this manner, a DDR zeolite membrane containing 1-adamantaneamine is formed on an inner surface of the surface layer.

The support body that forms a DDR zeolite membrane containing 1-adamantaneamine is heated to thereby combust and remove the 1-adamantaneamine. As described above, a separation membrane structure is completed that includes a porous support body and a DDR zeolite membrane.

Next, the separation membrane structure is accommodated in a stainless steel pressure-resistant container (containment body) that is provided with a gas support and gas discharge line, and the containment body is disposed in a cryostat. As described above, a nitrogen separation apparatus A is completed that includes the containment body and the separation membrane structure.

Preparation of Nitrogen Separation Apparatus B

A nitrogen separation apparatus B is prepared as described below.

Firstly, a support body is prepared in the same manner as the nitrogen separation apparatus A.

While supplying 1 kPa of helium gas from an outer periphery of the support body and applying pressure into the pores of the support body, a precursor solution of a polyimide resin is formed as a film configuration on an inner surface of the through-holes of the support body by a dipping process.

Next, a carbon membrane is formed by carbonization at 800 degrees C. in a nitrogen atmosphere. As described above, a separation membrane structure that includes a porous support body and a carbon membrane is completed.

Next, the separation membrane structure is accommodated in a stainless steel pressure-resistant container (containment body) that is provided with a gas support and gas discharge line, and the containment body is disposed in a cryostat. As described above, a nitrogen separation apparatus B is completed that includes the containment body and the separation membrane structure.

Nitrogen Separation Testing

Test Nos. 1 to 13 are proceeded using the nitrogen separation apparatus A and the nitrogen separation apparatus B to separate nitrogen from the raw material gas that contains methane and nitrogen. The nitrogen separation apparatus A that includes a separation membrane structure provided with a DDR zeolite membrane is used for Test Nos. 1 to 8, and the nitrogen separation apparatus B that includes a separation membrane structure provided with a carbon membrane is used for Test Nos. 9 to 13.

Firstly, the temperature of the cryostat is regulated so that the temperature of the separation membrane structure coincides with the temperatures shown in Table 1.

A pressurized raw material gas is supplied to the separation membrane structure. The composition of the pressurized raw material gas, the pressure of the pressurized raw material gas and the partial pressure of nitrogen contained in the pressurized raw material gas are shown in Table 1. Furthermore, the flow rate of the pressurized raw material gas is adjusted so that the nitrogen concentration in the nitrogen-depleted gas described below maintains the values shown in Table 1. The pressure of the nitrogen-enriched gas is fixed at 0.1 MPa.

Next, the composition and flow rate of the nitrogen-enriched gas that permeated through the separation membrane structure and the nitrogen-depleted gas that did not permeate through the separation membrane structure are measured. The flow rate of the nitrogen-enriched gas and the nitrogen-depleted gas is measured using a mass flow meter. The composition of the nitrogen-enriched gas and the nitrogen-depleted gas is measured by gas chromatography.

Next, methane loss (ratio of the methane that permeates the separation membrane structure to the methane in the pressurized raw material gas) and the nitrogen permeation rate/methane permeation rate are calculated based on the composition and flow rate of the nitrogen-enriched gas and the nitrogen-depleted gas.

TABLE 1

| Nitrogen Separation Test | Temperature of Separation Structure (°C.) | Pressurized Raw Material Gas Composition | Pressure (MPa) | Nitrogen Partial Pressure (MPa) | Concentration of Nitrogen in Nitrogen-Depleted Gas | Pressure of Nitrogen-Enriched Gas (MPa) | Nitrogen Partial Pressure in Pressurized Raw Material Gas/Pressure of Nitrogen-Enriched Gas | Nitrogen permeation rate/methane permeation rate | Concentration of Nitrogen in Nitrogen-Enriched Gas (%) | Methane loss (%) |
|---|---|---|---|---|---|---|---|---|---|---|
| No. 1 | −40 | methane 90 mol % nitrogen 10 mol % | 1.0 | 0.1 | less than 4 mol % | 0.1 | 1.0 | — | — | 14.3 |
| No. 2 | −40 | methane 90 mol % nitrogen 10 mol % | 2.0 | 0.2 | less than 4 mol % | 0.1 | 2.0 | 30 or more | 50 or more | 6.6 |
| No. 3 | −40 | methane 90 mol % nitrogen 10 mol % | 3.0 | 0.3 | less than 4 mol % | 0.1 | 3.0 | 30 or more | 50 or more | 5.1 |
| No. 4 | −40 | methane 90 mol % nitrogen 10 mol % | 4.0 | 0.4 | less than 4 mol % | 0.1 | 4.0 | 30 or more | 50 or more | 4.6 |
| No. 5 | −40 | methane 90 mol % nitrogen 10 mol % | 5.0 | 0.5 | less than 4 mol % | 0.1 | 5.0 | 30 or more | 50 or more | 4.3 |
| No. 6 | −70 | methane 95 mol % nitrogen 5 mol % | 2.0 | 0.1 | less than 1 mol % | 0.1 | 1.0 | — | — | 23.4 |
| No. 7 | −70 | methane 95 mol % nitrogen 5 mol % | 4.0 | 0.2 | less than 1 mol % | 0.1 | 2.0 | 20 or more | 20 or more | 14.0 |
| No. 8 | −70 | methane 95 mol % nitrogen 5 mol % | 6.0 | 0.3 | less than 1 mol % | 0.1 | 3.0 | 20 or more | 20 or more | 11.7 |
| No. 9 | −40 | methane 80 mol % nitrogen 20 mol % | 0.6 | 0.12 | less than 4 mol % | 0.1 | 1.2 | — | — | 88.5 |
| No. 10 | −40 | methane 80 mol % nitrogen 20 mol % | 1.0 | 0.2 | less than 4 mol % | 0.1 | 2.0 | 10 or more | 30 or more | 46.7 |
| No. 11 | −40 | methane 80 mol % nitrogen 20 mol % | 1.5 | 0.3 | less than 4 mol % | 0.1 | 3.0 | 10 or more | 30 or more | 31.9 |
| No. 12 | −40 | methane 80 mol % nitrogen 20 mol % | 2.0 | 0.4 | less than 4 mol % | 0.1 | 4.0 | 10 or more | 30 or more | 26.9 |
| No. 13 | −40 | methane 80 mol % nitrogen 20 mol % | 2.5 | 0.5 | less than 4 mol % | 0.1 | 5.0 | 10 or more | 30 or more | 24.6 |

Figure 5:
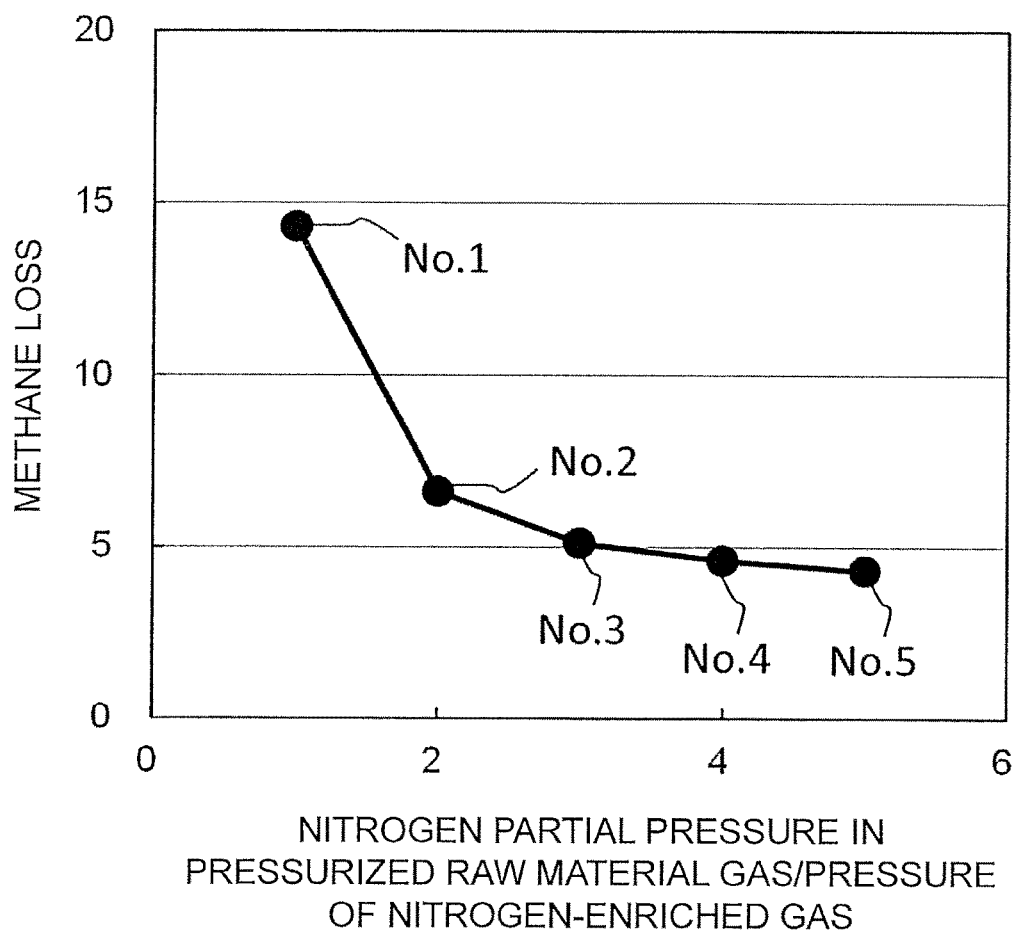
FIG. 5 illustrates a graph of a relationship between methane loss and (partial pressure of nitrogen in pressurized raw material gas/pressure of nitrogen enriched gas) in Test Nos. 1 to 5.
Figure 6:
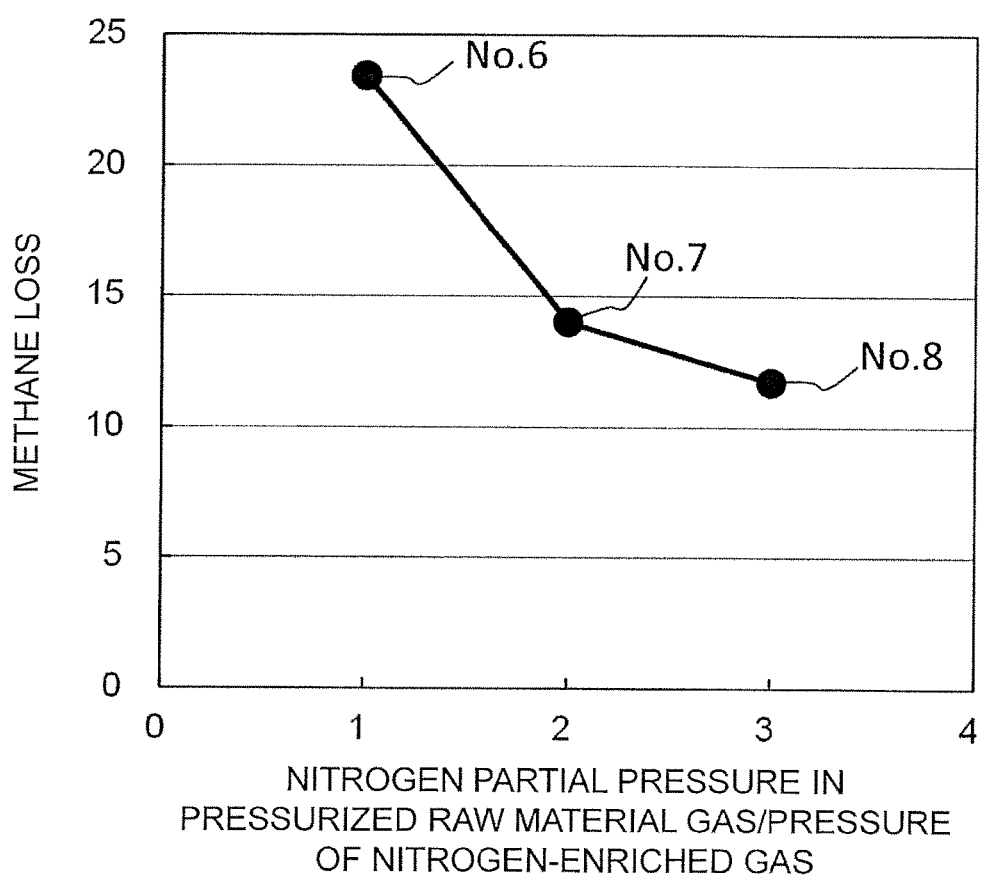
FIG. 6 illustrates a graph of a relationship between methane loss and (partial pressure of nitrogen in pressurized raw material gas/pressure of nitrogen enriched gas) in Test Nos. 6 to 8.
Figure 7:
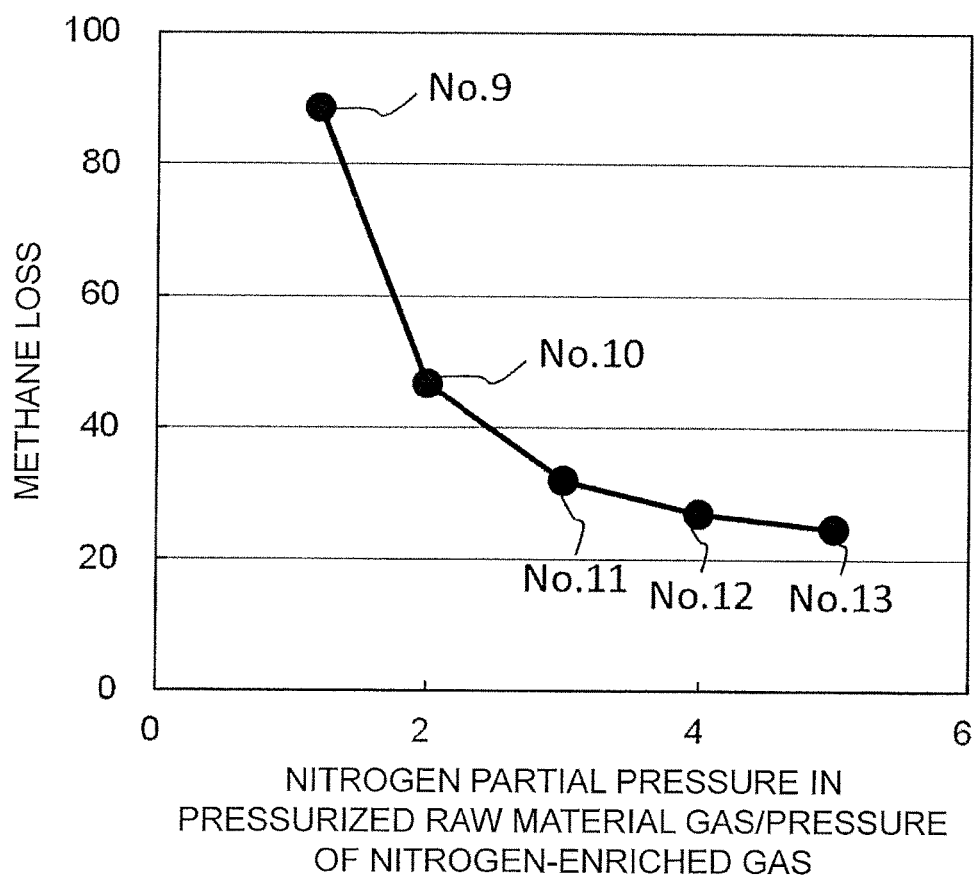
FIG. 7 illustrates a graph of a relationship between methane loss and (partial pressure of nitrogen in pressurized raw material gas/pressure of nitrogen enriched gas) in Test Nos. 9 to 13.

FIG. 5 illustrates a graph of a relationship between methane loss and (partial pressure of nitrogen in pressurized raw material gas/pressure of nitrogen-enriched gas) in Test Nos. 1 to 5. FIG. 6 illustrates a graph of a relationship between methane loss and (partial pressure of nitrogen in pressurized raw material gas/pressure of nitrogen-enriched gas) in Test Nos. 6 to 8. FIG. 7 illustrates a graph of a relationship between methane loss and (partial pressure of nitrogen in pressurized raw material gas/pressure of nitrogen-enriched gas) in Test Nos. 9 to 13.

As shown by Table 1 and FIG. 5 to FIG. 7, it can be seen that methane loss is reduced in Test Nos. 2 to 5, 7, 8, and 10 to 13 in which (partial pressure of nitrogen in pressurized raw material gas/pressure of nitrogen-enriched gas) is greater than or equal to 2. The value of the permeation rate of nitrogen/the permeation rate of methane is confirmed to be sufficiently maintained in Test Nos. 2 to 5, 7, 8, and 10 to 13. Even when the separation membrane structure is cooled to −140 degrees C., there is experimental confirmation that nitrogen separation performance is realized.

The invention claimed is:

1. A method of producing a nitrogen-depleted gas, the method comprising the steps of:
   pressurizing a raw material gas to configure a pressurized raw material gas, the raw material gas being in a vapor-liquid equilibrium state with a liquefied gas, the raw material gas containing methane as a principal component and greater than or equal to 1 mol % nitrogen;
   regulating a temperature of the pressurized raw material gas to be higher than a temperature of the raw material gas; and
   separating nitrogen contained in the pressurized raw material gas by use of a nitrogen selective permeation membrane configured from an inorganic material to produce a nitrogen-depleted gas and a nitrogen-enriched gas from the pressurized raw material gas; wherein
   in the pressurization step, the raw material gas is pressurized so that a partial pressure of nitrogen in the pressurized raw material gas is greater than or equal to 2 times and less than or equal to 5 times a pressure of the nitrogen-enriched gas.

2. The method of producing a nitrogen-depleted gas according to claim 1, wherein the temperature of the pressurized raw material gas is less than or equal to −40 degrees C.

3. The method of producing a nitrogen-depleted gas according to claim 1, wherein the nitrogen selective permeation membrane is configured from a zeolite and/or a zeolite like structure compound selected from the group consisting of silicalites, aluminosilicates, titanosilicates, aluminophosphates, and silica aluminophosphates.

4. The method of producing a nitrogen-depleted gas according to claim 3, wherein the zeolite and/or the zeolite like structure compound includes pores formed by an oxygen 8-membered ring.

5. A method of producing a nitrogen-enriched gas, the method comprising the steps of:
   pressurizing a raw material gas to configure a pressurized raw material gas, the raw material gas being in a vapor-liquid equilibrium state with a liquefied gas, the raw material gas containing methane as a principal component and greater than or equal to 1 mol % nitrogen;

regulating a temperature of the pressurized raw material gas to be higher than a temperature of the raw material gas; and separating nitrogen contained in the pressurized raw material gas by use of a nitrogen selective permeation membrane configured from an inorganic material to produce a nitrogen-depleted gas and a nitrogen-enriched gas from the pressurized raw material gas; wherein in the pressurization step, the raw material gas is pressurized so that a partial pressure of nitrogen in the pressurized raw material gas is greater than or equal to 2 times and less than or equal to 5 times a pressure of the nitrogen-enriched gas.

6. The method of producing a nitrogen-enriched gas according to claim 5, wherein the temperature of the pressurized raw material gas is less than or equal to −40 degrees C.

7. The method of producing a nitrogen-enriched gas according to claim 5, wherein the nitrogen selective permeation membrane is configured from a zeolite and/or a zeolite like structure compound selected from the group consisting of silicalites, aluminosilicates, titanosilicates, aluminophosphates, and silica aluminophosphates.

8. The method of producing a nitrogen-enriched gas according to claim 7, wherein the zeolite and/or the zeolite like structure compound includes pores formed by an oxygen 8-membered ring.

9. A method of nitrogen separation, the method comprising the steps of:

pressurizing a raw material gas to configure a pressurized raw material gas, the raw material gas being in a vapor-liquid equilibrium state with a liquefied gas, the raw material gas containing methane as a principal component and greater than or equal to 1 mol % nitrogen;

regulating a temperature of the pressurized raw material gas to be higher than a temperature of the raw material gas; and separating nitrogen contained in the pressurized raw material gas by use of a nitrogen selective permeation membrane configured from an inorganic material to produce a nitrogen-depleted gas and a nitrogen-enriched gas from the pressurized raw material gas; wherein in the pressurization step, the raw material gas is pressurized so that a partial pressure of nitrogen in the pressurized raw material gas is greater than or equal to 2 times and less than or equal to 5 times a pressure of the nitrogen-enriched gas.

10. The method of nitrogen separation according to claim 9, wherein the temperature of the pressurized raw material gas is less than or equal to −40 degrees C.

11. The method of nitrogen separation according to claim 9, wherein the nitrogen selective permeation membrane is configured from a zeolite and/or a zeolite like structure compound selected from the group consisting of silicalites, aluminosilicates, titanosilicates, aluminophosphates, and silica aluminophosphates.

12. The method of nitrogen separation according to claim 11, wherein the zeolite and/or the zeolite like structure compound includes pores formed by an oxygen 8-membered ring.

* * * * *